United States Patent
Skogstad et al.

(10) Patent No.: US 10,432,778 B2
(45) Date of Patent: Oct. 1, 2019

(54) PORTABLE COMMUNICATIONS DEVICES

(71) Applicant: Elliptic Laboratories AS, Olso (NO)

(72) Inventors: Ståle A Van Dorp Skogstad, Olso (NO); Tom Kavli, Nittedal (NO); Haakon Bryhni, Olso (NO)

(73) Assignee: ELLIPTIC LABORATORIES AS, Oslo (NO)

( * ) Notice: Subject to any disclaimer, the term of this patent is extended or adjusted under 35 U.S.C. 154(b) by 0 days.

(21) Appl. No.: 15/848,978

(22) Filed: Dec. 20, 2017

(65) Prior Publication Data

US 2018/0176364 A1     Jun. 21, 2018

Related U.S. Application Data

(60) Provisional application No. 62/436,604, filed on Dec. 20, 2016.

(51) Int. Cl.
| | |
|---|---|
| *H04M 1/72* | (2006.01) |
| *H04M 1/725* | (2006.01) |
| *G06F 1/16* | (2006.01) |
| *G01S 15/08* | (2006.01) |
| *G06F 3/041* | (2006.01) |
| *H04M 1/03* | (2006.01) |

(Continued)

(52) U.S. Cl.
CPC ......... *H04M 1/72569* (2013.01); *G01S 7/521* (2013.01); *G01S 15/08* (2013.01); *G01S 15/34* (2013.01); *G01S 15/87* (2013.01); *G06F 1/1626* (2013.01); *G06F 1/1684* (2013.01); *G06F 3/041* (2013.01); *G06F 3/043* (2013.01); *H04M 1/035* (2013.01); *H04M 1/605* (2013.01); *G06F 2203/04108* (2013.01); *G09G 2300/023* (2013.01); *H04M 2250/12* (2013.01); *H04M 2250/22* (2013.01)

(58) Field of Classification Search
CPC .. H04M 1/72569; H04M 1/035; H04M 1/605; H04M 2250/12; G01S 7/521; G01S 15/08; G01S 15/34; G01S 15/87; G06F 1/1626; G06F 3/041; G09G 2300/023
See application file for complete search history.

(56) References Cited

U.S. PATENT DOCUMENTS

| | | | |
|---|---|---|---|
| 2011/0136552 A1* | 6/2011 | Lee ................. | H04M 1/0245 455/575.3 |
| 2012/0162636 A1* | 6/2012 | Sy .................. | G01S 17/026 356/51 |

(Continued)

*Primary Examiner* — Tuan D Nguyen
(74) *Attorney, Agent, or Firm* — Beyer Law Group LLP

(57) ABSTRACT

A portable communications device comprises an interactive touchscreen display (20) having a transparent outer surface member occupying substantially all of a front surface of the communications device. A casing provides a rear surface of the communications device. The device further comprises an audible sound transmitter and an audible sound receiver arranged so as to receive vocal sounds produced by a user when the device is placed against the user's head. An ultrasonic transmitter (24) is separate from the audible sound transmitter. An elongate aperture (28) has a minimum dimension less than 100 µm located between the transparent outer surface member and the casing. A channel connects the elongate aperture and the ultrasonic transmitter so as to permit ultrasonic signals to pass out of the elongate aperture.

14 Claims, 4 Drawing Sheets

(51) Int. Cl.
    *H04M 1/60*     (2006.01)
    *G01S 7/521*     (2006.01)
    *G01S 15/34*     (2006.01)
    *G01S 15/87*     (2006.01)
    *G06F 3/043*     (2006.01)

(56) References Cited

U.S. PATENT DOCUMENTS

| | | | |
|---|---|---|---|
| 2014/0087792 A1* | 3/2014 | Park | H05K 5/061 455/575.1 |
| 2015/0141088 A1* | 5/2015 | Hosoi | H04M 1/035 455/575.1 |
| 2016/0094693 A1* | 3/2016 | Song | H04M 1/0208 455/575.1 |
| 2016/0127525 A1* | 5/2016 | Lee | H04M 1/0279 455/575.1 |
| 2016/0156755 A1* | 6/2016 | Choi | H04M 1/0266 455/575.1 |
| 2017/0115767 A1* | 4/2017 | Arola | G06F 3/044 |

\* cited by examiner

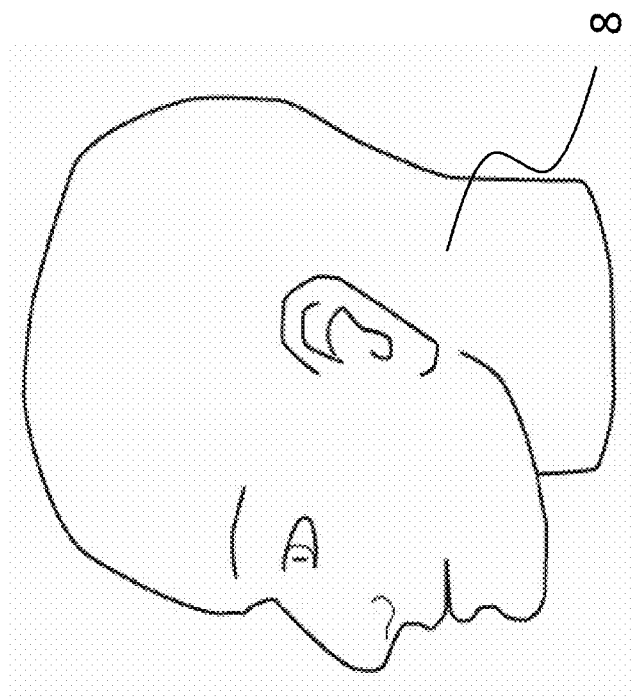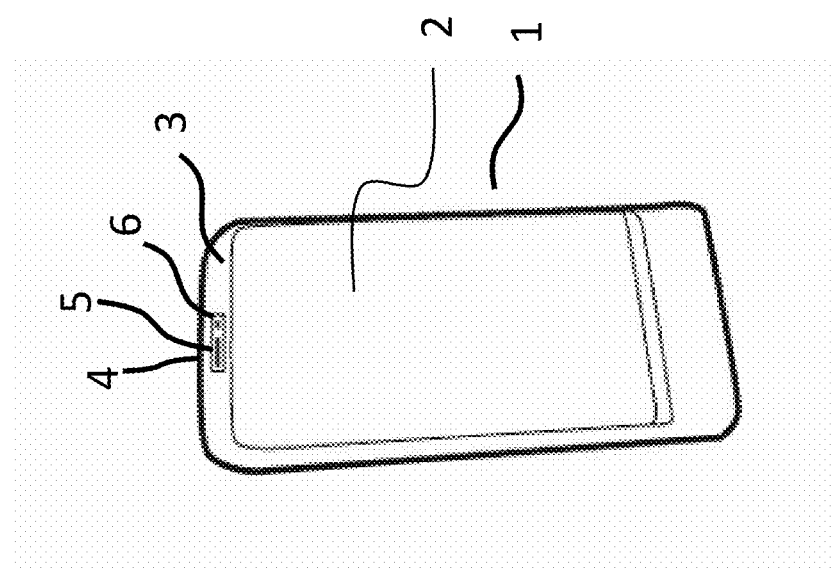
Fig. 1

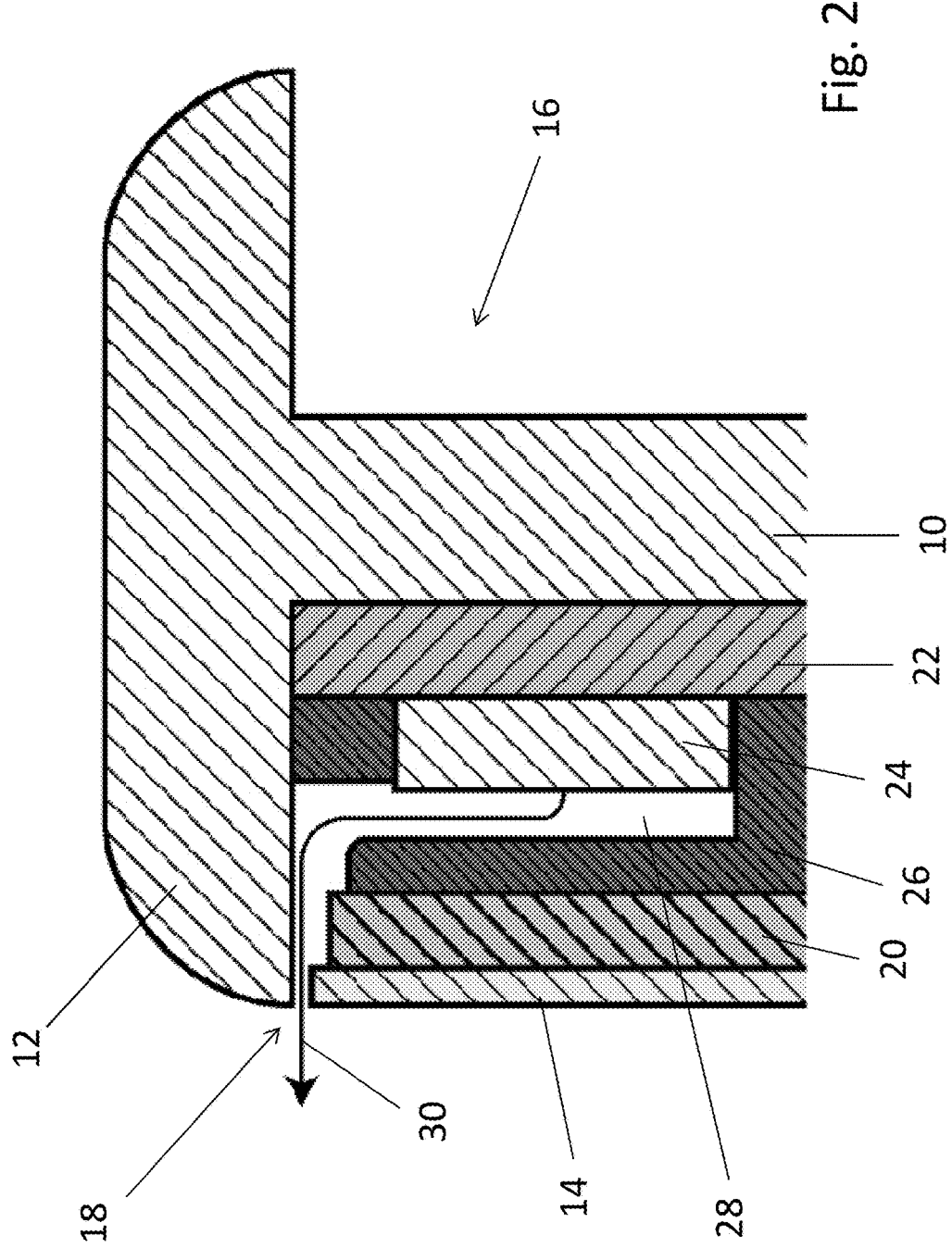

PORTABLE COMMUNICATIONS DEVICES

This application claims priority of U.S. Provisional Patent Application No. 62/436,604, filed on Dec. 20, 2016 and which is hereby incorporated by reference in its entirety for all purposes.

FIELD

This invention relates to portable electronic devices for communications, particularly those intended to be placed next to a user's head to facilitate speech communication such as a mobile or cellular telephone.

BACKGROUND

Conventional mobile devices such as smart-phones typically have a large touchscreen on the front of the device which is covered with glass. A thin metal rear casing concealing the internal components is retained to the glass to form a bezel. For functional reasons however it has been necessary to provide a number of apertures in the glass front, for example in order to allow a sound opening for a coil-based earpiece speaker.

More recently however there has been an increase in the perceived importance of the aesthetics of mobile devices, with physical design becoming a key selling point. This has led some smart-phone manufacturers to remove the conventional coil-based earpiece speaker which requires a sound opening. This helps to achieve an unbroken glass surface on the front of the phone which is considered visually appealing. Removing the earpiece also has the additional benefit that the display can be extended to the top of the bezel leaving only a small strip of area at the bottom of the device-front which does not provide display. Extending the display to the top-bezel allows for a larger display screen for the same phone size.

As a replacement for the coil-based earpiece in such devices, a piezo ceramic actuator is mounted to the main frame in the interior of the device. By driving the piezo actuator, microscopic vibrations spread to the frame and the bezel leading to the generation of audible sound without the use of a dedicated diaphragm. However to extend the display to the top edge of the bezel, other hardware components that normally reside in this area must also be replaced or removed. This applies particularly to the front-camera which needs to be omitted or removed to the lower front part of the phone.

However the approach outlined creates a problem for the proximity sensor which is typically provided. This traditionally comprises an infra-red transmitter and detector. The proximity sensor is typically used to detect when a user puts the phone to their head during a phone conversation, whereupon it sends a signal to deactivate the touchscreen. This prevents accidental inputs to the device (such as deactivating the call) due to contact between the screen and the user's head and also helps to reduce power consumption. The proximity sensor normally needs to be positioned close to the top part of the phone since (i) during a call the top-part is typically closer to the head than the bottom part, and (ii) placement at the bottom could lead to false detections if the user deliberately touched the screen with their hand. This means that the proximity sensor presents a challenge when seeking to achieve a design with the display extending to the top bezel.

SUMMARY

When viewed from a first aspect the present invention provides a portable communications device comprising:

a) an interactive touchscreen display having a transparent outer surface member occupying substantially all of a front surface of said communications device b) a casing providing a rear surface of said communications device;

c) an audible sound transmitter;

d) an audible sound receiver arranged so as to receive vocal sounds produced by a user when the device is placed against the user's head;

e) an ultrasonic transmitter, separate from said audible sound transmitter;

f) an elongate aperture having a minimum dimension less than 100 μm located between said transparent outer surface member and said casing;

g) a channel connecting said elongate aperture and said ultrasonic transmitter so as to permit ultrasonic signals to pass out of the elongate aperture.

The Applicant has discovered that an elongate aperture provided in accordance with the invention, namely having a minimum dimension less than 100 μm and located between the transparent outer surface member and the casing, may, at least in preferred embodiments, be effectively invisible to the naked eye and thus allow the provision of ultrasonic transmission capability without any significant detrimental effect on the appearance of the device. This can be exploited in a number of ways.

In a set of embodiments the ultrasonic transmitter forms part of a proximity sensor. Using an ultrasound-based proximity sensor which exploits the aforementioned effectively invisible aperture between the e.g. glass front of the device and the casing may give a significant advantage in obviating the need to provide a proximity sensor based on infra-red signals which requires a visible aperture on the front of the device e.g. in the glass.

The proximity sensor may be arranged to determine when the device is being held close to a user's head. Additionally/alternatively it may be arranged to determine that the device has been placed in a bag, pocket, sleeve, case or other location where the touchscreen is no longer required.

The aperture may be at an upper edge of the device. This may be advantageous as it is typically the part of a device such as a phone which is placed closest to the user's head when the user is engaged in a standard conversation. It therefore facilitates more reliable detection of this situation.

The aperture may have a shortest dimension between 20 and 100 μm. The shortest dimension of the aperture may be defined as the width, height or dimension at right angles to the longest dimension. The aperture may have a length or longest dimension greater than 100 μm—e.g. greater than 1 mm, e g greater than 10 mm The proximity sensor may further include an ultrasonic receiver. The ultrasonic receiver could comprise a microelectro-mechanical (MEMS) microphone. This could be a dedicated ultrasonic receiver or it could be a receiver which also receives audible sounds. This could be the audible sound receiver previously specified or a further receiver. For example in some designs a receiver for audible sound is provided on the upper part of the phone for active noise cancellation purposes. It is envisaged that such a receiver could also be used for the ultrasonic proximity sensor mentioned herein.

The proximity sensor may be arranged to transmit a signal from the transmitter and to determine proximity from a reflection of said signal received at said ultrasonic receiver.

In a set of embodiments said interactive touchscreen display comprises a screen stack comprising a plurality of layers arranged behind said transparent outer surface to generate images and to detect a user touching said transparent outer surface. The aperture may be arranged outside a boundary of said screen stack. The ultrasonic transmitter may be arranged behind said screen stack. Such arrangements demonstrate further the benefits of employing ultrasound-based proximity sensing as they allow a separation between the ultrasonic transmitter and the aperture which means that the transmitter can be located behind the screen stack whilst the aperture is outside the boundary thereof. The recited channel can act as a waveguide which can be suitably designed for the specific ultrasound frequencies used.

Moreover the narrow dimension of the aperture and its location between the transparent outer surface and casing means that an active touchscreen can be extended almost to the edge of the transparent outer surface. By contrast for example if a conventional infra-red proximity sensing arrangement were to be employed, this would either curtail the maximum extent of the active touchscreen area (so that the sensor could be placed outside of it) or would require the screen stack to be transparent which would be a significant technical challenge.

When viewed from another aspect the invention provides a portable communications device comprising:
   a) an audible sound transmitter;
   b) an audible sound receiver arranged so as to receive vocal sounds produced by a user when the device is placed against the user's head;
   c) an interactive touchscreen display occupying substantially all of a front surface of said communications device and comprising:
      i) a transparent outer surface;
      ii) a screen stack comprising a plurality of layers arranged behind said outer surface to generate images and to detect a user touching said outer surface;
   d) an ultrasonic transmitter, separate from said audible sound transmitter and arranged behind said screen stack;
   e) an aperture arranged outside a boundary of said screen stack; and
   f) a channel connecting said aperture and said ultrasonic transmitter so as to permit ultrasonic signals to pass out of said aperture.

BRIEF DESCRIPTION OF DRAWINGS

Certain embodiments of the invention will now be described, by way of example only, with reference to the accompanying drawings in which:

FIG. 1 is a schematic view illustrating a conventional smart-phone design';

FIG. 2 is an enlarged cross-section through a smart-phone in accordance with an embodiment of the invention;

DETAILED DESCRIPTION OF SPECIFIC EMBODIMENTS

Figure 3A:
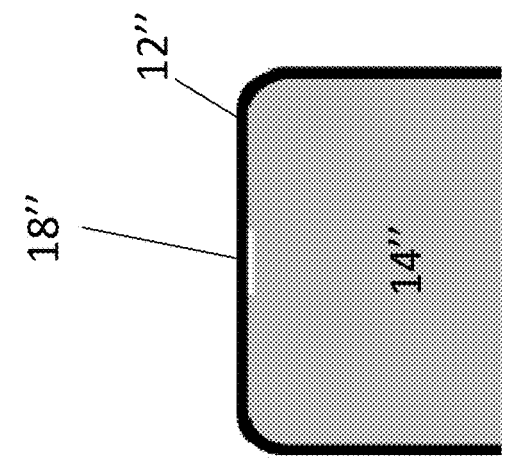
FIGS. 3a to 3c are schematics illustration of alternative arrangements of an aperture in accordance with the invention.

FIG. 1 shows a conventional smart-phone 1 with proximity sensing functionality. The phone 1 has a touch-enabled display screen 2 covered by a sheet of glass 3. An aperture 4 in the glass at the top of the phone allows sound to emanate from a loudspeaker 5, and to reach a microphone 6, which are mounted below the glass.

The loudspeaker 5 is able to generate audible and ultrasonic sounds. The microphone 6 can receive ultrasonic signals. A processing system within the phone 1 (not shown), which may include one or more DSPs, CPUs, microcontrollers, memory, etc., causes ultrasonic chirps to be emitted at intervals from the loudspeaker 5. These may reflect off a user's head 8 and be received by the microphone 6. If more than a threshold level of energy is reflected back to the microphone 6, from a reflector within a threshold maximum time-of-flight distance, such as when the phone 1 is brought to within a few centimeters of the side of the user's head 8, the processing system causes the touch input mechanism of the display screen 2 to be deactivated. It may also turn off the backlight of the display screen FIG. 2 is a partial cross-section through the upper edge portion of a smart-phone in accordance with an embodiment of the invention. The largest part visible in this Figure is the frame 10 which forms a structural substrate extending through the centre of the device and also forming a top bezel 12 which fits around the front glass screen 14 and also to the rear to form the upper boundary to a battery compartment 16 (the battery being omitted for clarity).

It will be noted that there is an elongate aperture (referred to hereinafter as a "micro-gap") 18 between the top edge of the glass 14 and the bezel 12 which will be discussed in greater detail below. Behind the glass screen is a standard liquid crystal display (LCD) stack 20 which includes both the liquid crystal itself and a matrix of capacitive sensors which enable detection of a user's fingertip on the outer surface of the glass 14 in the conventional way. The LCD stack 20 is connected (via connections not shown) to the main printed circuit board (PCB) 22 of the phone.

Also connected (physically and electrically) to the PCB 22 is an ultrasonic transmitter 24 such as the MuRata MA40H1S-R. A synthetic rubber gasket 26 is disposed between the PCB 22 and the LCD stack 20 and is shaped to fit around the transmitter 24. It therefore provides acoustic isolation between the transmitter 24 and the LCD stack 20, glass 14 and the rest of the interior of the 'phone. The gasket 26 forms a resonant cavity 28 directly in front of the transmitter 24. The resonant frequency of the cavity 28 may, for example, be on the order of 40 kHz. The cavity 28 is open at the upper end thereof and connects with the micro-gap 18 to allow sound emanating from the transmitter to pass through it to the exterior of the phone as indicated by the arrow 30. The ultrasound passing through the micro-gap 18 may be used for proximity detection in the same way as described above with reference to the prior art device of FIG. 1 and as described in more detail below.

The micro-gap 28 may have a width less than 100 μm ($100 \times 10^{-6}$ metres), e.g. 60 μm. The Applicant has discovered that at ultrasonic frequencies—namely those above 20 kHz, typically approximately 40 kHz—the diffraction and attenuation suffered by ultrasound waves is sufficiently low that they can be used for proximity detection. Advantageously, the Applicant has further appreciated that an aperture which is 100 μm or thinner is essentially invisible to the naked eye, especially when it is formed at the boundary between two separate components such as between the glass 14 and bezel 12 as in the present embodiment. This achieves the design objective of a (perceived) unbroken front surface. The very small width which enables the effective invisibility can be achieved since the micro-gap 28 does not need to function to allow audible sound signals to pass through it in addition; rather it is dedicated to the very short distance ultrasound proximity sensing function.

The width of the micro-gap 18 could be between 20 μm and 100 μm. This contrasts with sound openings used for audible audio which are at least 1 mm in the smallest dimension (on the transmit side). The micro-gap 18 is a slit and so may be longer, possibly much longer in a direction parallel with the width of the phone. It may for example be of the order of 1-2 cms. However it could be even wider, e.g. up to approximately the entire width of the phone with the small width and location between the glass and bezel allow it to remain effectively invisible.

As outlined above, the transmitter 24 generates ultrasonic sounds. A processing system within the phone (not shown), which may include one or more DSPs, CPUs, microcontrollers, memory, etc., mounted on the PCB 22 causes ultrasonic chirps to be emitted at intervals from the transmitter 24. A refined version of this is described further below. The ultrasonic chirps may reflect off a user's head and be received by a microphone (not shown) which can receive ultrasonic signals. The microphone could be provided in communication with the cavity 28 and micro-gap 18 or with a separate aperture—which could also have a smallest dimension less than 100 μm. Alternatively it could have a larger aperture but be located somewhere more discreet as the location of the microphone is less critical.

If more than a threshold level of energy is reflected back to the microphone, from a reflector within a threshold maximum time-of-flight distance, such as when the phone is brought to within a few centimeters of the side of the user's head, the processing system causes the touch input mechanism of the display screen 20 to be deactivated. Since the micro-gap 18 is positioned close to the top of the device, it is suitable for head detection in in-call scenarios.

Figure 3B:
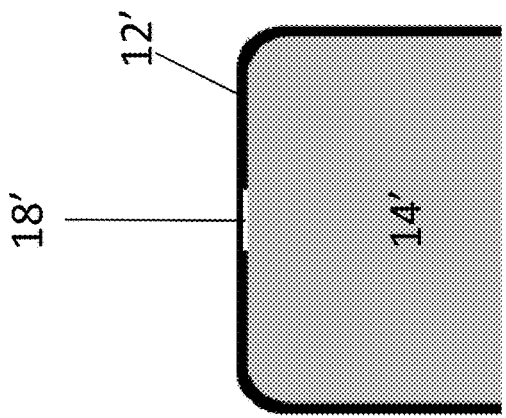
Figure 3C:
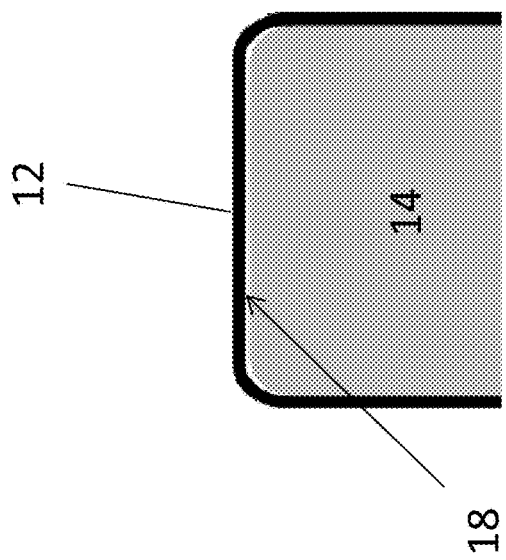

With reference to FIGS. 3a to 3c, the aperture 18 may be due to a general gap between the glass 14 and bezel 12 as shown in FIG. 3a. Equally however it could be provided by a local recess 18' in the bezel 12' as shown in FIG. 3b or by a local recess 18" in the glass 14". The recess 18', 18" may be an integrated part of the production process or it may be formed after production by simply applying a cut.

Returning to FIG. 2, it may be noted that although the display 20 may be perceived by a user to extend all the way to the top bezel 12 because the glass 14 does, there is in practice a small space in between (e.g. 1 mm). Thus there is no LCD stack 20 beneath the cover glass 14 in this section. This means that it possible to fit the acoustic waveguide (upper part of cavity 28) between the display stack 20 and the bezel wall 12. It is not considered viable to make the waveguide go through the display stack. In this configuration the transmitter 24 is located underneath (i.e. behind) the display stack 20 which is considered to be novel.

The processing system may also cause a continuous sine wave to be emitted from the transmitter 24. For a static input object the frequency of the transmit and return signals are identical, but when the input object is moving there will be a shift in frequency proportional to the speed of the object relative to the mobile device. The frequency or Doppler shift of the reflected signal is approximately $\Delta f = 2\, f0 \cdot v/c$, where f0 is the frequency of the transmitted signal, v is the speed of the reflector towards the transmitter 24 and microphone, and c is the speed of sound in air. A positive shift in frequency therefore indicates a movement towards the device, while a negative shift indicates a movement away from the device. The frequency distribution is computed by taking the Fourier transform of the received signal after down-converting and down-sampling.

Figure 4:
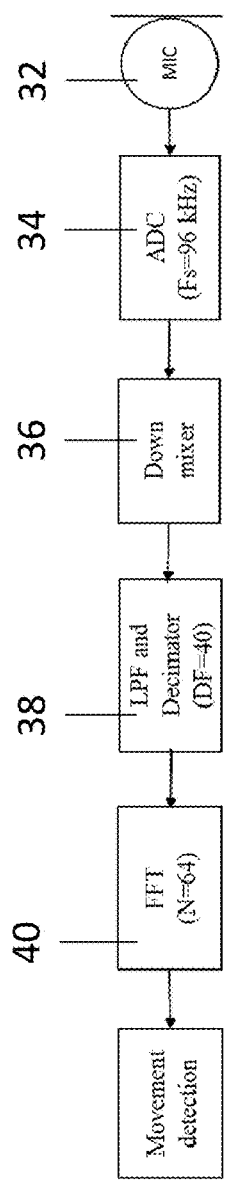
FIG. 4 is a block diagram of the functional blocks of a proximity detection system which can be used with embodiments of the invention.
Figure 5:
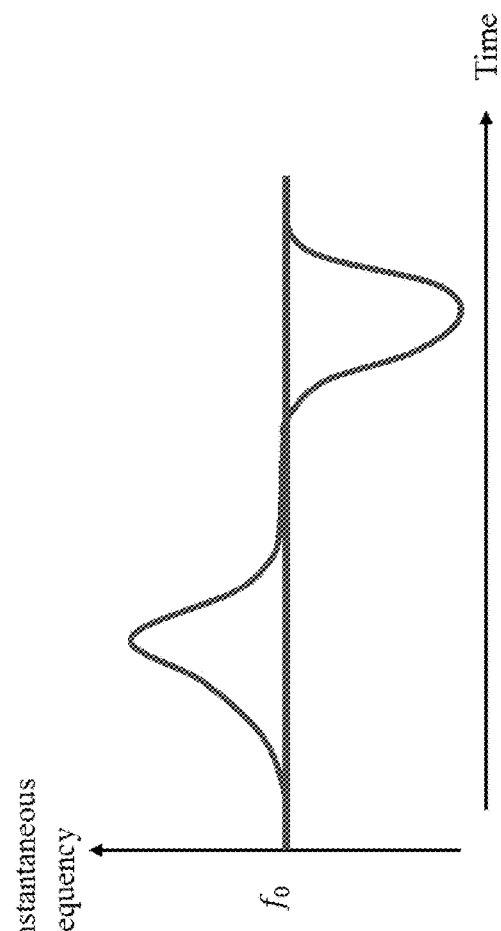
FIG. 5 is a plot of frequency vs time for a reflected ultrasound signal undergoing Doppler shift as a device is moved towards and away from a user's head.

In one implementation, illustrated in FIG. 4, a reflected signal is received at the microphone 32. This may have been transmitted at a frequency of 40 kHz. The received signal is fed to an analogue-to-digital (ADC) converter 34, which samples at 96 kHz. The ADC 34 outputs to a down-mixer 36 and a low-pass filter (LPF) and decimator block 38, which down-convert the received signal to complex baseband and down-sample by a factor of forty. The maximum observable frequency shift is then 1.2 kHz, which translates into a speed of approximately 5 m/s. A fast Fourier transform (FFT) block 40 then computes the Fourier transform on blocks of sixty samples, which correspond to an observation window of 25 ms per frequency estimate. The frequency spectrum information from the FFT block 40 may be analyzed to determine motion information for one or more objects spaced away from the phone, based on Doppler shift effects. In other words, whenever the user brings the phone to his ear, or moves it away from his ear, there will be a distinct and detectable pattern of frequency shifts in the received signal. FIG. 5 illustrates an example trajectory in the time-frequency plane. Initially, positive shifts are registered as the phone is put to the head. The frequency shift then falls to zero as the phone momentarily comes to rest. Finally, negative shifts are registered when the phone is withdrawn. At the same time, there is also a constant contribution with zero shift due to the direct signal from the speaker 24 to the microphone, which may be disregarded.

By analyzing the received signal in the time-frequency domain, the motion of the phone relative to the head may be deduced. This may, alone or in combination with other information, be used to determine whether the user is holding the phone to the head.

The functional blocks shown in FIG. 4 may be implemented in hardware, in software, or in a combination of both.

The embodiment described above allows proximity sensing to be provided in a 'continuous glass' design without having to rely on the piezo-actuator used for regular (audible) audio which is not suitable as it uses the frame 10 to vibrate and is therefore highly non-localised. Although a dedicated ultrasonic transmit arrangement is employed which is a disadvantage in terms of cost it, gives increased design flexibility as it is not required to co-design for audible sound. Specifically the design exploits the fact that the shorter wavelength of ultrasound makes ultrasound better suited for penetrating small openings. The difference in attenuation is especially pronounced compared to lower audible frequencies. Normally audible sound transmitted through small openings sounds "thin" due to the relatively larger attenuation of the lower part of the spectrum. Also while high fidelity audible sound requires a relatively flat response throughout the entire audible band, the ultrasound proximity application requires a much smaller bandwidth. This means that acoustic designs that achieve resonance at one or more frequencies can be exploited.

What is claimed is:
1. A portable communications device comprising:
  a) an interactive touchscreen display having a transparent outer surface member occupying substantially all of a front surface of said communications device
  b) a casing providing a rear surface of said communications device;
  c) an audible sound transmitter;
  d) an audible sound receiver arranged so as to receive vocal sounds produced by a user when the device is placed against the user's head;

e) an ultrasonic transmitter, separate from said audible sound transmitter;
f) an elongate aperture having a minimum dimension less than 100 µm located between said transparent outer surface member and said casing;
g) a channel connecting said elongate aperture and said ultrasonic transmitter so as to permit ultrasonic signals to pass out of the elongate aperture.

2. The device as claimed in claim 1 wherein the ultrasonic transmitter forms part of a proximity sensor.

3. The device as claimed in claim 2 wherein the proximity sensor is arranged to determine when the device is being held close to a user's head.

4. The device as claimed in claim 2 wherein the proximity sensor is arranged to determine that the device has been placed in a bag, pocket, sleeve or case.

5. The device as claimed in claim 2 wherein the proximity sensor further includes an ultrasonic receiver.

6. The device as claimed in claim 5 wherein the ultrasonic receiver comprises a receiver which also receives audible sounds.

7. The device as claimed in claim 5 wherein the proximity sensor is arranged to transmit a signal from the transmitter and to determine proximity from a reflection of said signal received at said ultrasonic receiver.

8. The device as claimed in claim 1 wherein the aperture is at an upper edge of the device.

9. The device as claimed in claim 1 wherein the aperture has a smallest dimension between 20 and 100 µm.

10. The device as claimed in claim 1 wherein the aperture has a longest dimension greater than 100 µm.

11. The device as claimed in claim 1 wherein said interactive touchscreen display comprises a screen stack comprising a plurality of layers arranged behind said transparent outer surface to generate images and to detect a user touching said transparent outer surface.

12. The device as claimed in claim 11 wherein the aperture is arranged outside a boundary of said screen stack.

13. The device as claimed in claim 11 wherein the ultrasonic transmitter is arranged behind said screen stack.

14. A portable communications device comprising:
a) an audible sound transmitter;
b) an audible sound receiver arranged so as to receive vocal sounds produced by a user when the device is placed against the user's head;
c) an interactive touchscreen display occupying substantially all of a front surface of said communications device and comprising:
 i) a transparent outer surface;
 ii) a screen stack comprising a plurality of layers arranged behind said outer surface to generate images and to detect a user touching said outer surface;
d) an ultrasonic transmitter, separate from said audible sound transmitter and arranged behind said screen stack;
e) an aperture arranged outside a boundary of said screen stack; and
f) a channel connecting said aperture and said ultrasonic transmitter so as to permit ultrasonic signals to pass out of said aperture.

* * * * *